US008877833B2

(12) United States Patent
Droniou et al.

(10) Patent No.: US 8,877,833 B2
(45) Date of Patent: Nov. 4, 2014

(54) SELF-PRECIPITATING AQUEOUS PARTICULATE COMPOSITION COMPRISING PIGMENT BINDER PARTICLES

(75) Inventors: Patrick Droniou, Colombes (FR); Konstantinos Markou, Cologne (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 173 days.

(21) Appl. No.: 13/152,899

(22) Filed: Jun. 3, 2011

(65) Prior Publication Data

US 2011/0311827 A1    Dec. 22, 2011

Related U.S. Application Data

(63) Continuation of application No. PCT/EP2009/066722, filed on Dec. 9, 2009.

(30) Foreign Application Priority Data

Dec. 11, 2008   (DE) .................. 10 2008 061 048

(51) Int. Cl.

| C08K 3/10 | (2006.01) |
|---|---|
| C08K 9/00 | (2006.01) |
| C09D 5/08 | (2006.01) |
| C09C 1/30 | (2006.01) |
| C09D 7/12 | (2006.01) |
| C09C 1/56 | (2006.01) |
| C09C 3/10 | (2006.01) |
| C09C 1/00 | (2006.01) |
| C08K 3/00 | (2006.01) |
| C08K 9/04 | (2006.01) |

(52) U.S. Cl.
CPC ............. *C09D 5/088* (2013.01); *C08K 3/0033* (2013.01); *C01P 2004/61* (2013.01); *C08K 9/04* (2013.01); *C09C 1/3072* (2013.01); *C09D 7/1225* (2013.01); *C09C 1/56* (2013.01); *C09C 3/10* (2013.01); *C09C 1/0081* (2013.01)
USPC ............ 523/205; 524/435; 428/418; 252/393

(58) Field of Classification Search
USPC ............ 524/435; 428/418; 252/393; 523/205
See application file for complete search history.

(56) References Cited

U.S. PATENT DOCUMENTS

| 4,462,226 | A | * | 7/1984 | Fleissner ...................... 68/5 D |
|---|---|---|---|---|
| 5,157,080 | A | * | 10/1992 | Gardner et al. ............... 525/134 |
| 5,492,614 | A | * | 2/1996 | Zawacky et al. .............. 205/224 |
| 5,646,211 | A | * | 7/1997 | Honda et al. .................. 524/406 |
| 5,854,323 | A | * | 12/1998 | Itabashi et al. .................. 524/88 |
| 6,656,595 | B2 | * | 12/2003 | Nakajima et al. ............. 428/413 |
| 7,037,385 | B2 | | 5/2006 | Kucera et al. |
| 7,138,444 | B2 | | 11/2006 | McGee et al. |
| 2004/0048963 | A1 | * | 3/2004 | Sawada et al. ................ 524/423 |
| 2005/0009954 | A1 | * | 1/2005 | Gebhard et al. .............. 523/210 |
| 2005/0065242 | A1 | * | 3/2005 | McGee et al. ................ 523/402 |
| 2007/0100074 | A1 | * | 5/2007 | Devonport et al. ........... 525/107 |
| 2007/0173593 | A1 | * | 7/2007 | Fies et al. ...................... 524/556 |
| 2008/0160199 | A1 | | 7/2008 | Nadupparambil Sekharan et al. |
| 2009/0018271 | A1 | * | 1/2009 | Ohno et al. .................... 525/131 |

FOREIGN PATENT DOCUMENTS

| EP | 1270687 | 1/2003 |
|---|---|---|
| EP | 1630136 | 3/2006 |
| WO | 03026888 A1 | 4/2003 |
| WO | WO2007112503 | 10/2007 |
| WO | WO2008036259 | 3/2008 |

OTHER PUBLICATIONS

"Santolink." Innovadex. http://www.innovadex.com/coatings/detail/2423/78444/santolink-EPO-560 2012.*
International Search Report for PCT/EP2009/066722, dated Aug. 6, 2010, 3 pages.
DIN 55943, Beuth-Henkel AG & Co. KGaA-KdNr. 4652948-LfNr. 5284599001-2011-03-31 09:52. Oct. 2001. Published in Germany. Listed on p. 6, line 9 of the specification.
DIN EN 21524, Beuth-Henkel AG& Co. KGaA-KdNr.4652948-LfNr. 5284599001-2011-03-31 09:52. Sep. 1991. Published in Germany. Listed on p. 10, line 14 of the specification.

* cited by examiner

*Primary Examiner* — Hannah Pak
(74) *Attorney, Agent, or Firm* — Mary K. Cameron

(57) ABSTRACT

The present invention relates to an acidic, aqueous, particulate composition having a high stability with respect to agglomeration for autophoretic deposition of organic-inorganic hybrid layers on metal surfaces, comprising, in addition to iron(III) ions, fluoride ions and at least one dispersed organic binder (B), pigment-binder particles comprising a pigment portion and a binder portion (B), such that the binder (B) comprises a polymer of at least one monomer having acid groups and at least one polymerizable double bond. Likewise, the invention relates to the use of an aqueous dispersion comprising pigment-binder particles comprising a pigment portion and a binder portion (B) for the production of a self-depositing composition as well as a method for autophoretic deposition on metal surfaces.

16 Claims, No Drawings

SELF-PRECIPITATING AQUEOUS PARTICULATE COMPOSITION COMPRISING PIGMENT BINDER PARTICLES

CROSS-REFERENCE TO RELATED CASES

This application is a continuation under 35 U.S.C. Section 365(c) and 120 of International Application No. PCT/EP2009/066722, filed Dec. 9, 2009 and published on Jun. 17, 2010 as WO 2010/066785, which claims priority from German Patent Application No. 10 2008 061 048.8 filed Dec. 11, 2008, which are incorporated herein by reference in their entirety.

FIELD OF THE INVENTION

The present invention relates to an acidic aqueous particulate composition of a high stability with respect to agglomeration for the autophoretic deposition of organic-inorganic hybrid layers on metallic surfaces containing, in addition to iron(III) ions, fluoride ions and at least one dispersed organic binder (B), pigment-binder particles composed of a pigment portion and a binder portion (B1), where the binder (B1) is a polymerizate of at least one monomer having acid groups, which has at least one polymerizable double bond. The invention likewise relates to the use of an aqueous dispersion containing pigment-binder particles composed of a pigment portion and a binder portion (B1) for producing a self-precipitating composition as well as a method for autophoretic deposition on metallic surfaces.

BACKGROUND OF THE INVENTION

Self-precipitating compositions, which are also referred to as autophoretic baths in the technical jargon, are used for organic coating of metallic surfaces, usually iron surfaces, as a corrosion-preventing primer coating of metallic components or as an adhesive intermediate layer in the production of metal-elastomer compounds, for example, for vibration-damping components in the automotive industry. Autophoretic coating is thus a dip coating method which is performed without an external electric current, in contrast with electrodip coating, i.e., without applying an external voltage source. The self-precipitating compositions are usually aqueous dispersions of organic resins or polymers, which coagulate directly on the surface of the component in a thin liquid layer directly at the surface of the component on coming in contact with the metallic surface due to the pickling removal of metal cations and thereby determine the layer structure. The layer structure is self-limiting because the coverage of the metallic surface with the coagulated resin particles and/or polymer particles leads to a decline in metal dissolution, so that the coagulation process is delayed and ultimately terminated.

The technical implementation of the autophoretic deposition requires constant monitoring of the bath composition. First, the deposition bath must be adjusted so that a self-precipitation occurs rapidly enough and homogeneously enough on contact with the component, such that the stability of the dispersion in the interior of the dip bath must be permanently ensured at the same time. In addition, the concentration of the cations absorbed from the dip bath during the deposition process must not be allowed to rise above a bath-specific threshold level because otherwise the aqueous dispersion as a whole becomes unstable and coagulates.

The coatings deposited directly from autophoretic baths at first have a gelatinous consistency and therefore must additionally be converted to films. To this end, both organic resins and curing agents which crosslink with one another under thermal treatment are included in the self-precipitating compositions to thereby produce a closed polymeric coating, which protects against corrosion and can withstand mechanical stresses.

Both surfactant-stabilized dispersions and also polymer-stabilized dispersions which are suitable for providing a self-precipitating composition are known from the state of the art.

U.S. Pat. No. 7,037,385 discloses aqueous dispersions of an ionically modified phenolic resin, which can be adjusted to be self-precipitating by adding an acid, preferably phosphoric acid. The ionically modified phenolic resins disclosed there are self-dispersing. Such compositions should also impart an increased breaking strength to the coating in addition to providing corrosion protection of the coated component. The mechanical layer properties can be regulated according to the teaching of U.S. Pat. No. 7,037,385 by adding flexibilizing components based on polymer compounds, for example, polyacrylonitrile butadiene or polyacrylates.

However, U.S. Pat. No. 7,138,444 discloses compositions containing a dispersion of an epoxy resin obtained by emulsion polymerization of ethylenically unsaturated compounds in the presence of an epoxy precursor. For dispersion, mechanical methods are used with the aid of surface-active compounds, preferably anionically modified nonylphenols ethoxylates. Additional components include a curing agent based on blocked isocyanates as well as flow control agents and coagulation aids for thermal filming of the self-precipitating coating. In addition, U.S. Pat. No. 7,138,444 teaches that the solids content of the dispersion can be reduced if so-called accelerators consisting of fluoride ions and trivalent iron ions are added to a dispersion of the epoxy resin.

Additional additives typical of lacquer are usually added to autophoretic baths to impart certain physical properties to the fully hardened self-precipitating organic coating. The addition of colored pigments, especially black pigments based on carbon blacks, is a typical measure for visually opaque coloration of the organic self-precipitating coating on the metallic surface. However, practice has shown that such formulations often have only a low stability and the particulate components often sediment after only a short standing time of the autophoretic bath. However, agglomerates of carbon black particles together with the dispersed organic main binder can no longer be effectively deposited in a homogeneous and film-forming manner on a metallic surface introduced into self-precipitating compositions. Thus there is still a demand in the state of the art for extremely stable particulate compositions for autophoretic applications which contain, as colloidal organic binders, dispersed ingredients of an inorganic nature and/or which may be present in dispersed form as solid particles with another particle size distribution or surface charge in addition to the main organic binder. Likewise, in the automotive industry in particular, in the initial coating of metallic surfaces, the initial coating is required to not only laminate the metallic substrate but additionally to allow the application of top coats which impart color. For this purpose, however, only such initial coatings which reflect light mostly in the visible range and therefore contain a large amount of white pigment accordingly are allowed for such initial coatings. The addition of white pigments, for example, oxides of the metals titanium or zinc, with which those skilled in the art are familiar in the production of lacquer in an autophoretic composition does not usually yield stable particulate compositions because of the different manner of stabilization of the inorganic pigments and the dispersed main binder. For example, specifically dispersions of inorganic pigments based on oxides in the presence of polyvalent metal cations exhibit rapid agglomeration and therefore are very difficult to stabilize in self-precipitating compositions having a high iron(III) ion content. The stabilization of inorganic pigments is accomplished, for example, with certain wetting agents which may be ionic and nonionic surface-active compounds or water-soluble polymeric compounds. The specific wetting agents for inorganic pigments are therefore usually of a different chemical nature than those used for stabilization of the colloidal ingredients of the binder and for their use in self-precipitating compositions. Self-precipitating compositions usually have at least partial stabilization due to anionic surface-active substances. The difference in stabilization determines directly an exchange of the surface-active substances for the respective dispersed ingredients, so that agglomeration also occurs in such formulations and the bath stability exists only for a limited period of time.

In addition, for the complexing of the iron(III) ions, self-precipitating compositions also contain substantial quantities of fluoride ions, which in particular cause corrosion of inorganic pigments based on oxides and silicates and thus substantially reduce the pigment portion available for the autophoretic coating and thereby necessitate continuous addition of the pigment portion and fluoride ions to be able to establish the desired condition of the autophoretic bath. However, this is impossible, depending on the dissolution kinetics of the inorganic pigments due to the fluoride that is present.

In addition, the particulate components of autophoretic baths must be stable with respect to shearing forces which occur, for example, in circulation of the bath in the pump stands. For example, the commercial pigment preparations in which the particulate pigment portion is stabilized with wetting agents have a marked agglomeration tendency at those locations in the bath where high shear rates occur, as a component of autophoretic baths, because wetting agent is sheared away from the surface of the pigment particles.

SUMMARY OF THE INVENTION

An object of the present invention is therefore, firstly, to increase the stability of aqueous particulate compositions, which are suitable for self-precipitation on metallic surfaces and whose pigment portion consists of a dispersed binder portion and a dispersed pigment portion, in technical practice in comparison with rapid agglomeration and, secondly, to effectively suppress the dissolution of certain inorganic pigments in such a particulate composition.

Pigments in the sense of the present invention are understood to be all insoluble particulate components which fall under DIN 55943 for pigments as well as being inorganic fillers with which those skilled in the art are familiar for production of lacquer and which are used for adjusting the mechanical properties of lacquer coatings, for example.

This object and other objects of the invention are achieved by one aspect of the invention: an aqueous particulate composition for self-precipitation on metallic surfaces having a pH of less than 4 but preferably no less than 2, containing
a) at least one dispersed organic binder (B),
b) iron(III) ions,
c) fluoride ions in an amount, such that the molar ratio of fluoride ions to iron(III) ions from water-soluble compounds is at least 2:1,
wherein the composition additionally contains
d) dispersed pigment-binder particles composed of a pigment portion and a binder portion (B1), wherein that the binder portion (B1) comprises or consists at least partially of a polymerizate of monomers with a polymerizable double bond, wherein at least one monomer has at least one acid group, so that the binder portion has an acid number of at least 20 mg KOH/g.

"Self-precipitating composition" is understood according to the invention to refer to those compositions which, on coming in contact with metallic surfaces, induce coagulation of the organic ingredients of the composition to form a layer on the metallic surface, preferably such surfaces selected from iron, zinc and aluminum as well as alloys thereof. This requires primarily that there must be a sufficiently high solution pressure of metal cations of the metallic surface to be coated on contact with the self-precipitating composition to initiate destabilization of the particulate aqueous composition and thus coagulation of the colloidally dissolved and/or dispersed ingredients a) and d) as a homogeneous film directly on the metallic surface. Such a coalesced film of colloid ingredients on the metallic surface is thermally curable and, as a crosslinked organic-inorganic hybrid coating, protects the metallic surface from corrosion. Secondarily, a self-precipitating composition according to the invention has long-term stability and thus does not tend to coagulate in the aqueous phase so that such compositions have a sufficient lifetime and are suitable for use in coating installations, for example, as an immersion bath.

The particle portion of the composition according to the invention is composed of the totality of colloidally dispersed and water-insoluble particulate compounds contained therein. This therefore comprises the dispersed organic binder portion (B) according to component a) and the dispersed pigment-binder particle portion according to component d) and optionally the organic binder portion (B1), which is also dispersed and is not contained in the composition according to the invention in the form of dispersed pigment-binder particles. The particle portion is thus formed in part by particles composed of a pigment portion and a binder portion (B1), such that the binder portion (B1) consists at least partially of a polymerizate of monomers having polymerizable double bonds such that at least one monomer has at least one acid group.

To determine the particle portion of the composition, destabilization and agglomeration of the colloids and the dispersed particulate portions can be induced by increasing the ionic strength in the aqueous phase by adding water-soluble salts, for example, by adding high concentrations of Fe(III) or Al(III) salts. The phase separation thereby induced makes it possible to determine the particle portion. Such a phase separation may be performed for the case when anionic surfactants are used to stabilize the composition; also by demulsifiers based on cationic surfactants, for example, quaternary alkylammonium compounds.

As an alternative to this, the dispersed particle portion may also be determined physically by complete sedimentation, for example, by means of ultracentrifugation.

The particulate compositions according to the invention are characterized by their high stability, which is based on the fact that the pigment to be dispersed is in the form of pigment-binder particles, in which the pigment particles are encapsulated at least partially by the organic binder (B1). In this way, firstly, the agglomeration of the pigment-binder particles in the composition according to the invention, which additionally also contains the dispersed binder (B) can be largely prevented, and, secondly, corrosion of the pigment particles in the acidic fluoride-containing composition can also be largely prevented.

The properties of the composition according to the invention thus differ fundamentally with regard to the stability of the composition and the pigment particles from such a particulate composition, which contains equal amounts of identical pigments and binders (B) and (B1), in which the pigment portion as such is present in the form of pigment particles and the binder portion as such is present in the form of binder particles, both in dispersed form. In such compositions not according to the invention, there is rapid coagulation of the particulate components as well as optionally a rapid dissolution of pigment particles, in particular metallic pigments and pigments based on inorganic oxides, so that an industrial application of self-precipitating baths having such a composition is impossible.

The aqueous particulate composition according to the invention for self-precipitation on metallic surfaces with a pH of less than 4 but preferably no less than 2, containing
a) at least one dispersed organic binder (B),
b) iron(III) ions,
c) fluoride ions in an amount, such that the molar ratio of fluoride ions to iron(III) ions from water-soluble compounds is at least 2:1, and
d) dispersed pigment-binder particles composed of a pigment portion and a binder portion (B1), such that the binder portion (B1) consists at least partially of a polymerizate of monomers with polymerizable double bonds, such that at least one monomer has at least one acid group,
is obtainable by adding a dispersion containing water and pigment-binder particles prepared by dispersing a pigment portion in powder form consisting of at least one pigment with a binder portion (B1) dispersed in water, such that the dispersion is performed with the help of a dissolver from 2 to 120 minutes at a rotational speed of the dissolver disk of at least 20 m/s until achieving at least a grindometer value of the dispersion of less than 10 μm, and such that the diameter of the dissolver disk is preferably no larger than half the diameter of the dissolver container, and the distance between the dissolver disk and the bottom of the dissolver container is preferably no less than half the diameter, but no more than the entire diameter of the dissolver disk, and the ratio of the volume-based portions of pigment to binder (B1) is preferably no greater than 3:1, especially preferably no greater than 3:2, to an aqueous phase containing
a) at least one dispersed organic binder (B),
b) iron(III) ions,
c) fluoride ions in an amount such that the molar ratio of fluoride ions to iron ions from water-soluble compounds is at least 2:1.

In this way, compositions according to the invention, in which the dispersed pigment portion is optimally wetted with the binder (B1), are obtainable.

The dissolver allows dispersion of individual particles of the pigment portion by breaking up agglomerates of the pigment particles at high shearing forces. In the presence of the binder (B1) dispersed in water, the pigment particles are wetted with the binder (B1) and the pigment-binder particles are produced.

Effectively only those particulate components of the composition according to the invention whose particle size is less than 10 μm may be precipitated on a metallic surface by coalescence and converted to a film to produce a homogeneous organic-inorganic hybrid coating.

Accordingly, the dispersed particle portion in the composition according to the invention preferably has a D90 value of no more than 10 μm, preferably no more than 5 μm. A D90 value indicates that 90 vol % of the particles of a particulate composition are below the stated particle size. Such values can be determined from volume-weighted cumulative particle size distributions, which can be measured with the help of dynamic light scatter methods.

Depending on the grain size of the pigment powder to be dispersed, wet milling using a bead mill may optionally be performed in addition to dispersion with the dissolver, and this is continued until a grindometer value of less than 10 μm according to DIN EN 21 524 is measured in the paste of the pigment-binder. The paste produced in this way can be used subsequently to obtain a composition according to the invention.

The wetting of the pigment powder with the organic binder (B1) dispersed in water and the high stability of the compositions according to the invention achieved in this way containing dispersed pigment-binder particles are especially effective for pigment powder with a grain size of more than 1 μm according to the production method described above in which the dispersion of the particulate components is induced by shearing forces in a liquid medium. In this production process, the ratio of the D50 value of the extremely fine-grained pigment to the D50 value of the dispersed binder (B1) is preferably at least 5, such that the D50 value of the extremely fine-grained pigment in the dispersion of the pigment powder in deionized water is to be determined after dispersion by means of a dissolver, such that the conditions used are identical to those used for producing the pigment-binder particles. The extremely fine-grained pigment is the pigment of a majority of pigment powders to be dispersed having the lowest D50 value.

In such a preferred case, the progress in the production of pigment-binder particles by dispersion by means of the dissolver can be understood on the basis of the reduction in the dispersed binder portion (B1) in the volume-weighted cumulative particle size distribution. The particulate portion of the dispersed binder particles (B1) can be differentiated from the pigment portion on the basis of its average particle sizes, so that optimum wetting of the pigment particles with organic binder (B1) is achieved when the organic binder (B1) portion does not decrease further even with further dispersion with the dissolver.

As already mentioned, pigments are understood to include water-insoluble inorganic powders. They comprise colored pigments, corrosion preventing pigments, active pigments but also fillers with a specific functionality, for example, to adjust the grindability or mechanical properties of the self-precipitating and cured coating, where the mechanical properties are evaluated in test methods such as the mandrel bending test or the Erichsen test. The water-insoluble active pigments also include metallic powders, preferably non-noble metals such as zinc and aluminum, which go into solution as such with decomposition of water but are adequately protected against dissolution in the form of pigment-binder particles. Pigments whose components have an equilibrium concentration in the aqueous phase at pH 7 of less than 1 mM, preferably less than 0.1 mM at 20° C., are considered to be water insoluble.

With the dispersed pigment-binder particles contained in the composition according to the invention, the total pigment portion, which is present as such pigment-binder particles in the composition, is preferably formed by at least one pigment selected from colored pigments, active pigments and/or corrosion-preventing pigments.

The pigment portion of a single pigment-binder particle always consists of at least one pigment particle selected from colored pigments, corrosion-preventing pigments and/or active pigment particles.

As preferred pigments which form the pigment portion of the pigment-binder particles, the composition according to the invention contains at least one compound selected from oxides, carbonates, sulfates and phosphates of at least one metallic and/or semi-metallic element and/or from carbon black and metals, preferably metals with a negative electrochemical standard potential. These compounds are preferably selected from the corresponding water-insoluble salts of at least one of the metallic or semi-metallic elements silicon, titanium, zirconium, zinc, chromium, manganese, iron, magnesium, calcium and barium.

Especially preferred colored pigments as the pigment portion of pigment-binder particles in the composition according to the invention include black and white pigments selected from carbon black, preferably oxidatively modified carbon black with more than 5 wt % oxygen, titanium dioxide, barium sulfate and zinc oxide.

Especially preferred corrosion-preventing pigments as the pigment portion of the pigment-binder particles in the composition according to the invention are water-insoluble phosphates of the elements zinc, iron, aluminum, calcium and/or manganese as well as oxides of the elements zinc, zirconium, silicon and/or iron.

Especially preferred active pigments as the pigment portion of the pigment-binder particles in the composition according to the invention include carbonates and sulfates of the elements calcium, barium, strontium and metallic pigments of the elements zinc, aluminum and/or magnesium as well as silicates.

The dispersed pigment-binder particles according to component d) contain at least partially a polymerizate of monomers with a polymerizable double bond as the binder portion (B1) in the composition according to the invention, wherein at least one monomer has at least one acid group to create an associating interaction of the binder portion with the pigment particles in producing the pigment-binder particles and thereby ensure a high stability of the pigment-binder particles dispersed in the acidic aqueous composition.

The binder portion (B1) of the pigment-binder particles according to component d) preferably has an acid number of at least 40 mg KOH/g, preferably no more than 80 mg KOH/g, especially preferably no more than 60 mg KOH/g. Higher acid numbers of the binder according to component d) may result in strongly hydrophilic surface regions being formed in the self-precipitating and crosslinked organic-inorganic hybrid coating containing the pigment-binder particles, these strongly hydrophilic surface regions having a high permeability for water and typical corrosion-promoting salts and compounds.

For providing the composition according to the invention as described above, the pigment portion is mechanically triturated and dispersed in powder form with the binder portion (B1). The binder portion (B1) is preferably present in the form of an aqueous dispersion of the binder (B1) at least during the production process of the composition according to the invention. Such a dispersion of the binder containing at least partially a polymerizate of monomers with polymerizable double bonds, wherein at least one monomer has at least one acid group, is obtainable by emulsion polymerization in which all the binder portion is homogenized as a hydrophobic phase in water, optionally as an emulsion with the help of surface-active substances, which have at least one polymerizable double bond, stabilized and then polymerized by means of free radical initiators. Such an aqueous dispersion of the binder (B1) contains the binder in the form of colloidal particles, such that the binder as a whole and the individual particles of the dispersion of the binder (B1) are at least partially composed of a polymerizate of monomers with polymerizable double bonds, such that at least one monomer has at least one acid group. Dispersions containing water in which the D50 value of the particles of the dispersion of the binder (B1) is at a particle size of no more than 500 nm are preferred in particular for producing pigment-binder particles; dispersions in which the D90 value of the particles of the dispersion of the binder (B1) is at a particle size of no more than 500 nm are especially preferred.

The self-precipitating composition according to the invention contains in the binder portion (B1) of the pigment-binder particles at least partially a polymerizate of monomers with a polymerizable double bond, wherein at least one monomer has at least one acid group. The at least one monomer with at least one acid group is preferably selected from acrylic acid, methacrylic acid, maleic acid, methyl maleic acid, fumaric acid, itaconic acid, vinylphosphonic acid, vinylsulfonic acid, 2-acrylamido-2-methylpropanesulfonic acid and/or styrenesulfonic acid.

In an especially preferred embodiment of the composition, the binder (B1) contains at least partially a polymerizate of at least two monomers, wherein at least one monomer having at least one carboxyl group is included and at least one monomer having at least one sulfonic acid group is included. This ensures that, first of all, the binder (B1) will wet the pigment particles in the alkaline medium to a sufficient extent and will thus disperse them and, secondly, an excellent stability of the pigment-binder particles in the acidic medium of the self-precipitating composition according to the invention will result.

The monomer containing at least one carboxyl group is preferably selected from acrylic acid, methacrylic acid, maleic acid, methyl maleic acid, fumaric acid and/or itaconic acid.

The monomer containing at least one sulfonic acid group is preferably selected from vinylsulfonic acid, 2-acrylamido-2-methylpropanesulfonic acid and/or styrenesulfonic acid.

It has been found that an especially good stability of the pigment-binder particles in the acidic composition according to the invention occurs when the amount by weight of monomers with sulfonic acid groups, calculated as the amount by weight of $SO_3$ in the total binder portion composed of the binders (B) and (B1), is at least 0.5 wt %.

The polymerizate especially preferably consists at least partially of at least one monomer with a sulfonic acid group and additional monomers selected from acrylic acid, methacrylic acid, maleic acid, methyl maleic acid, fumaric acid and itaconic acid.

In addition, the polymerizate may contain as an ingredient of the binder (B1) of the pigment-binder particles at least one monomer with a polymerizable double bond, which does not have an acid group to establish the preferred ranges for the acid number of the binder (B1). These binders, which do not contain an acid group, are preferably selected from vinyl esters, vinyl ethers, acrylic acid esters, styrenes and/or acrylamides.

Furthermore, the polymerizate may contain, as an ingredient of the binder (B1) of the pigment-binder particles, reactive anionic emulsifiers having at least one polymerizable double bond in addition to at least one monomer with a polymerizable double bond, wherein at least one monomer has at least one acid group.

Such emulsifiers undergo radical crosslinking with the other monomeric components and form the polymerizate as an ingredient of the binder (B1) which as such causes an improved dispersibility of the pigment-binder particles by way of the anionic head group of the emulsifier, so that an even greater stability of the compositions according to the invention can be achieved.

Preferred reactive emulsifiers are based on derivatized polyoxyalkylene alkyl ethers and/or polyoxyalkylene aryl ethers, which have an unsaturated double bond in their hydrophobic basic structure and an anionic head group in the hydrophilic basic structure, the latter preferably being selected from a sulfate, sulfonate, phosphate and phosphonate group.

In an especially preferred embodiment of the composition according to the invention, the reactive anionic emulsifiers, as an ingredient of the binder (B1) of the pigment-binder particles, are selected from compounds corresponding to the following general structural formula (I):

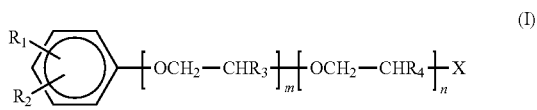

wherein $R_1$ is an aliphatic radical with no more than 14 carbon atoms, preferably no more than 12 carbon atoms, but at least three carbon atoms;
wherein $R_2$ is an unsaturated alkyl radical with no more than six carbon atoms but at least two carbon atoms;
wherein $R_3$ and $R_4$, independently of one another, are selected from hydrogen or a methyl group;
wherein m and n are independent natural numbers, wherein $1 \leq m+n \leq 60$;
wherein X is an anionic group selected from —O—$SO_3$, —$SO_3$, —O—$PO_3$ or —$PO_3$.

The composition according to the invention is characterized in particular in that its particle portion need not be additionally stabilized by anionic surfactants, so that the self-precipitating composition preferably contains no more than 10 ppm, especially preferably no more than 1 ppm, anionic surfactants which do not have any polymerizable double bonds.

According to the invention, no other components are necessary for the binder (B1) in addition to the polymerizate in order to successfully surround the pigment particles with the binder (B1) and thus stabilize them in the self-precipitating composition. However, it may be preferable for the binder (B1) to contain additional components in the manner of the binder (B) to improve the thermal crosslinking of the binder (B) with the pigment-binder particles after coalescence of the particulate components on the metallic surface. If the binder (B1) also contains components having thermally crosslinking functionalities, then after curing definitely improved barrier properties of the organic-inorganic hybrid coating may be implemented.

Suitable additional ingredients of the binder (B1), which do not constitute a polymerizate of monomers with polymerizable double bonds and nevertheless are advantageous for producing the pigment-binder particles and also for curing the self-precipitating coating, are those which are mentioned below in the description of the dispersed binder (B) according to the component a) of the composition according to the invention, in particular at least one epoxy resin and optionally at least one curing agent for the epoxy resin.

Organic binders (B) according to component a) meet the requirement of being water dispersible and thermally crosslinkable. Such binders (B) therefore consists of organic oligomers or polymeric compounds having at least two functional groups and are thus capable of reacting with one another in condensation reactions or addition reactions to form covalent bonds and thereby creating a network of covalently linked oligomeric or polymeric compounds. Binders (B) may consist either of a self-crosslinking oligomeric or polymeric compound with two different or the same functional groups capable of crosslinking with one another, based on their functionalization. With regard to the variant mentioned last, those skilled in the art also speak of a single component system consisting of the resin to be crosslinked and the crosslinking agent or curing agent.

Water-dispersible epoxy resins produce an especially good barrier effect with respect to corrosive media as a crosslinked coating on a metallic surface and are therefore a preferred component of the dispersed binder (B) according to component a) of the self-precipitating composition according to the invention. The epoxy resin may optionally contain crosslinking curing agents, preferably based at least partially on phenolic resins, to accelerate the curing process and increase the degree of crosslinking. Additional curing agents that crosslink the epoxy resin include those based on isocyanate resins, whose isocyanate groups may also be present in blocked form. Moderately reactive isocyanates are present in the binder of the pigment-binder particles as preferred blocked isocyanate resins, for example, aliphatic isocyanates and sterically hindered and/or acid-stable blocked isocyanates.

Preferably incompletely crosslinked oligomeric or polymeric compounds with three epoxy groups, for example, with a terminal bond whose preferred molecular weight is no less than 500 u [sic; μm] and no greater than 5000 u [sic; μm] are preferably used as the epoxy resins. Examples of such epoxy resins includes epichlorohydrin adducts onto bisphenol A and bisphenol F as well as epoxy-phenol novolacs.

For reasons of profitability and commercial availability, epoxy resins based on bisphenol A corresponding to the following general structural formula (II) are preferred with the scope of the present invention:

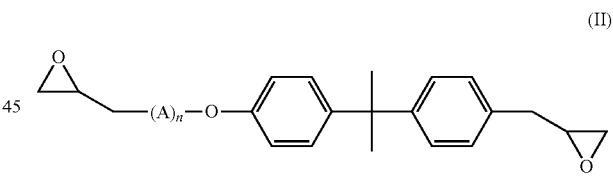

Structural building block A here corresponds to the following general formula (III)

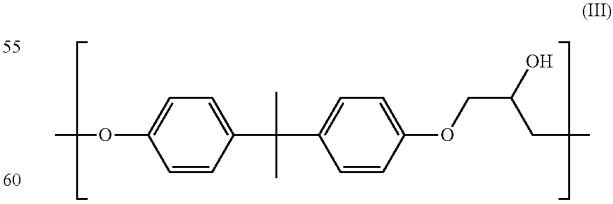

wherein n is an integer from 1 to 50.

Especially preferred epoxies have an epoxy equivalent weight (EEW) of no less than 100 g/eq but no more than 5000 g/eq. The EEW indicates the average molecular weight per mol of epoxy functionality in the epoxy resin in grams per molecular equivalent (g/eq). For special epoxy resins, there are especially preferred ranges for the epoxy equivalent weight:

| | |
|---|---|
| Brominated epoxy resins | 300-1000 g/eq and in particular 350-600 |
| Polyalkylene glycol epoxy resins | 100-700 g/eq and in particular 250-400 |
| Liquid epoxy resins | 150-250 g/eq |
| Solid/pasty epoxy resins | 400-5000 g/eq and in particular 600-1000 |

The curing agents which optionally also belong to the binder portion of the dispersed binder (B) are preferably low- and high-molecular organic compounds with hydroxy functionalities and/or amine functionalities whose preferred molecular weight is no less than 100 u [sic; µm] and no greater than 10,000 u [sic; µm]. Especially suitable curing agents have hydroxy functionalities and have a hydroxy equivalent weight (HEW) of no less than 50 g/eq especially preferably no less than 200 g/eq but the HEW is preferably no greater than 1000 g/eq and especially preferably no greater than 500 g/eq. The HEW indicates the average molecular weight per mol of hydroxy functionality in the curing agent in grams per molecular equivalent (g/eq), where the hydroxy equivalent weight also comprises "protected" hydroxyl groups in the polymer basic structure of the curing agent which are temporarily linked to low-molecular organic compounds via condensation or addition reactions, but these are split off again at elevated temperatures with crosslinking with the epoxy resin. A preferred "protective group" is the low-molecular alcohols which temporarily convert the hydroxyl group to an ether group. The preferred phenolic resins which form at least a part of the curing agent are incompletely crosslinked oligomeric or polymeric polycondensation products of formaldehydes with phenols, which preferably have at least partially etherified hydroxyl groups and whose preferred average molecular weight is no less than 500 u [sic; µm] and no greater than 10,000 u [sic; µm]. The film-forming thermal crosslinking of the epoxy resin on metallic surfaces is comparatively further improved if it consists completely of phenolic resins and if more than 50%, preferably more than 80% of the hydroxyl groups are present in etherified form. The hydroxyl groups are preferably methylated, ethylated, propylated, butylated or ethinylated. Both resols and novolacs may be used as the phenolic resin types. In addition, the weight-based ratio of epoxy resin to phenol resin for an optimal thermal curing of the coalesced colloid content containing the binder should preferably be no greater than 95:5 and preferably no less than 50:50.

To achieve adequate stability of the dispersed binder (B) on the one hand and sufficiently effective coalescence of the dispersed binder particles on the metallic surface on the other hand, such compositions according to the invention in which the D50 value of the particles of the dispersed binder (B) is at a particle size of no more than 500 nm, in particular those in which the D90 value of the particles of the dispersion of the binder (B) is at a particle size of no more than 500 nm, are preferred. A D50 value indicates that 50 vol % of the particles of the dispersion are smaller than the specified particle size. Such values can be determined from volume-weighted cumulative particle size distributions, which can be ascertained with the help of dynamic light scatter methods.

In a preferred embodiment, the binder (B) differs from the binder (B1) only in that, in addition to the polymerizate of monomers with a polymerizable double bond, wherein at least one monomer has at least one acid group, it also contains thermally crosslinking organic ingredients, especially preferably the epoxy resins described above and optionally phenolic resins as curing agents.

A composition according to the invention in which the binder portion (B1) also additionally contains thermally crosslinking organic constituents based on epoxy resins and thus the binders (B) and (B1) comprise identical binder portions is especially preferred. Both preferred embodiments are characterized in that both the dispersion of at least one organic binder (B) and the dispersion of the binder (B1) are obtainable as described above for production of the pigment-binder particles by means of emulsion polymerization of the monomeric unsaturated constituents in aqueous phase. However, in contrast with the binder (B1), such dispersed binders (B) according to component a) of the composition according to the invention, which have an acid value of less than 5 mg/KOH, are preferred so that, for example, the relative proportion of thermally crosslinking epoxy resins in the binder (B) is greater than that in the binder (B1).

In addition, for a composition according to the invention, it is preferable for the volume-based ratio of binder (B) to binder (B1) to be no less than 1:3, preferably no less than 1:2.

These two measures mentioned last ensure optimal corrosion protection of the metallic surface due to the cured self-precipitated coating.

On the whole, the dispersed particle portion of the composition according to the invention preferably amounts to at least 1 wt %, especially preferably at least 3 wt % content less than 1 wt % of dispersed binder (B), pigment-binder particles and optionally dispersed binder (B1) interfere with the self-precipitation of a coating of these particulate constituents on contact of the composition according to the invention with a metallic surface. The particle portion preferably does not exceed 30 wt % for easier servicing of the technical operation of the self-precipitating bath.

The amount of fluoride ions of the composition according to the invention is understood to refer to the total quantity of free fluoride ions and those bound in complex form in water-soluble compounds. The fluoride portion determines firstly the pickling rate in the composition according to the invention for the respective metallic surface and secondly masks metal cations so that coagulation of the particulate ingredients of the composition according to the invention is prevented even at an elevated metal ion content, which thus increases the lifetime of the self-precipitating baths. To increase the pickling rate on the metallic surface and to accelerate coagulation in immediate proximity to the metallic surface, a molar ratio of fluoride ions to iron(III) ions of at least 3:1 in the self-precipitating composition is preferred.

However, the molar ratio of fluoride ions to iron(III) ions in the composition according to the invention should preferably not exceed 6:1, especially preferably 4:1 because otherwise the metallic surface would be attacked too much and the result would be a great surface roughness.

The total portion of iron(III) ions dissolved in the composition according to the invention is preferably at least 0.02 wt %, but preferably no more than 0.3 wt %, especially preferably no more than 0.2 wt %, based on the element iron. If the preferred minimum quantity of iron(III) ions is much below that, the oxidation potential of the composition according to the invention is very low, resulting in delayed precipitation kinetics for the particulate ingredients. However, the change in and/or inhibition of self-precipitation may also cause the development of nonhomogeneous coatings so this tends to be a disadvantage. Excessively high concentrations of iron(III) ions may result in severe attack on the metallic surfaces to be treated and cause high surface roughness. In addition, the composition tends to be susceptible to precipitation of iron (III) salts and coagulation of particle portions even at relatively identical portions of masking fluoride ions.

To maintain or further increase the oxidation potential, the aqueous composition may additionally contain an oxidizing agent, preferably hydrogen peroxide. The addition of hydrogen peroxide is important in particular in the treatment of iron-containing surfaces for the conversion from iron(II) to iron (III) ions because iron(II) ions cause a greater reduction in the stability of the particulate dispersed ingredients in fluoride-containing compositions that the corresponding iron (III) ions.

Additional optional components of the composition according to the invention include flow agents such as glycol ethers and alcohol esters, for better film forming of the precipitated coating on the metallic surface and foam suppressants, preferably based on nonionic surfactants.

In a particularly preferred embodiment, the particulate composition according to the invention contains, based on the total composition:
a) 0.5 to 10 wt % of at least one dispersed organic binder (B),
b) 0.02 to 0.3 wt % iron(III) ions,
c) fluoride ions in an amount such that the molar ratio of fluoride ions to iron ions from water-soluble compounds is at least 2:1,
d) a portion of the aqueous dispersion containing pigment-binder particles obtainable by dispersion of a pigment portion in powder form consisting of at least one pigment with the binder portion (B1) dispersed in water, such that the dispersion is performed with the help of a dissolver for 2 to 120 minutes at a circumferential velocity of the dissolver disk of at least 20 m/s and up to a grindometer value of the dispersion of less than 10 μm is obtained and the diameter of the dissolver disk is preferably no larger than half the diameter of the dissolver container, and the distance of the dissolver disk from the bottom of the dissolver container is preferably no less than half but no more than the entire diameter of the dissolver disk, and the ratio of the volume-based portions of the pigment to binder (B1) is preferably no greater than 3:1, and
enough water, counter ions to b) and c) and optionally additional excipients that the total of all portions yields 100 wt % and the particle portion is no less than 3 wt %.

The volume-based portions of pigment to binder (B1) are calculated as follows:

$$\sum_i \frac{m(P_i)}{\rho(P_i)} \bigg/ \frac{m(B1)}{\rho(B1)}$$

wherein
$m(P_i)$: mass of the $i^{th}$ pigment
$r(P_i)$: density of the $i^{th}$ pigment
$m(B1)$: mass of the binder (B1) in the dispersion of the binder (B1)
$r(B1)$: density of the binder (B1) after separation and drying of the binder portion (B1) from the dispersion of the binder (B1)

As an expedient, a density of the binder (B1) of 1.2 g/cm$^3$ may be assumed for estimating the volume-based portions of pigment to binder (B1).

The invention additionally relates to an aqueous dispersion containing pigment-binder particles composed of a pigment portion and a binder portion (B1), such that the pigment-binder particles as binder (B1) consist at least partially of a polymerizate of at least two monomers having a polymerizable double bond, such that at least one monomer having at least carboxyl group and also at least one monomer having at least one sulfonic acid group are contained therein, such that the ratio of volume-based total portion of the pigments to volume-based total portion of the pigment (B1) does not exceed a value of 3 and the solids portion in the composition amounts to at least 20 wt %. Such an aqueous dispersion according to the invention has an excellent stability and may be used for production of a self-precipitating composition according to the invention, which has previously been described and has a pH of less than 4.

In a method according to the invention for coating metallic surfaces, the cleaned, degreased metallic surface, i.e., freed of organic impurities is brought into contact with a self-precipitating composition according to the invention. Metallic surfaces selected from surfaces of iron, zinc and/or aluminum as well as their respective alloys are preferred. The composition is preferably brought in contact with the metallic surface of the metal component by the dip or spray method, but the dip method is especially preferred because of the more homogeneous wetting of the surface.

In an ongoing dip method according to the invention in which surfaces containing iron are treated, the redox potential may be used as an indicator for the ratio of iron(II) ions to iron(III) ions in the self-precipitating composition and may be regulated by adding hydrogen peroxide, so that the greatest possible bath stability can be ensured. The redox potential is the electrochemical equilibrium potential of a redox system measured on an inert metal electrode, for example, platinum.

In a preferred embodiment, a reactive rinsing is performed after bringing the composition in contact with the metallic surface with or without a rinsing step in between.

Such a reactive rinsing fulfills the task of additionally protecting the metallic surface coated by the method according to the invention against corrosion and thus corresponds to a passivating aftertreatment of the uncrosslinked coating. The reactive rinsing follows the treatment with a self-precipitating composition directly, i.e., with or without a rinsing step in between, but in any case takes place before the hardening of the lacquer-like coating. Such a reactive rinsing produces an inorganic conversion of free metallic surface to so-called microdefects, for example, with the help of phosphate-containing solutions, which may also contain alkali and/or alkaline earth metal cations and also transition metal cations as well as their fluoro complexes.

The film forming of the layer and/or coating may take place either immediately after bringing the composition in contact with the metallic surface, i.e., with or without a rinsing step in between, or the coating is cured only after the reactive rinsing has been performed. The process of film forming or of curing the gelatinous coating is preferably performed at temperatures of at least 90° C. and at most 250° C.

Furthermore, the present invention comprises a metallic substrate preferably a substrate having surfaces of iron, zinc and/or aluminum coated by the method according to the invention by bringing the substrate in contact with a self-precipitating composition.

In this method according to the invention, coated metallic substrates are used in automotive manufacturing, in the fields of architecture, construction and agriculture and for the production of tools, machines and household appliances.

EXEMPLARY EMBODIMENTS

1a—Production of a Dispersion of the Binder (B)

Dispersions of the main binder (B) are prepared from an emulsion of the composition according to Table 1 homogenized discontinuously three times at 800 bar in the M-110 F Microfluidizer® (reaction chambers H 210Z and H 230Z, Microfluidics Corporation). The emulsions thereby prepared have an average particle size of approximately 250 nm and a monomodal particle distribution. The particle size and particle distribution were determined by using the Zetasizers® Nano S 90 (Malvern Instruments).

TABLE 1

Emulsion for preparation of an aqueous dispersion 1a of the main binder (B)

| Component | Chemical designation | Amount in wt % |
|---|---|---|
| Epoxy resin | Epichlorohydrin/bisphenol A EEW: 860-930 g/eq $M_n$: approximately 2000 g/mol | 16.4 |
| Curing agent | Allyl ether of mono-, di- and trimethylolphenols | 6.0 |
| Surfactant | Ammonium lauryl sulfate | 0.4 |
| Polymerizate | | 16.4 |
| Monomers | Butyl acrylate | 4.9 |
| | Methacrylic acid | 0.3 |
| | Methyl methacrylate | 5.2 |
| | Hydroxyethyl methacrylate | 0.6 |
| | Styrene | 5.4 |
| Flow agent | Trimethylpentane-1,3-diol monoisobutyrate | 1.4 |
| Water | Deionized water | 59.4 |

An initiator system is then added to this oil-in-water emulsion (Table 2) and radical emulsion polymerization of the unsaturated monomers is performed at 60° C. After polymerization, a dispersion (1a) of the main binder according to component a) of the composition according to the invention with a particle portion of approximately 40 wt % is obtained.

TABLE 2

Initiator system for radical emulsion polymerization of the emulsified and homogenized compositions P1 and P2 according to Table 1

| Component | Chemical designation | Quantity portion in wt %[1] |
|---|---|---|
| Reducing agent | Iron(II) sulfate | $2.3 \approx 10^{-1}$ |
| Oxidizing agent | Sodium formaldehyde sulfoxylate | 0.12 |
| | tert-Butylhydroperoxide | 0.17 |

[1]Based on the total composition according to Table 1

2a—Preparation of a Dispersion of the Binder (B1)

A dispersion of the binder (B1) is prepared from an emulsion of the composition according to Table 1 homogenized discontinuously three times at 800 bar in the M-110 F Microfluidizer® (reaction chambers H 210Z and H 230Z, Microfluidics Corporation). The resulting emulsions have an average particle size of approximately 250 nm and a monomodal particle distribution. The particle size and particle distribution were determined using the Zetasizers® Nano S 90 (Malvern Instruments).

TABLE 3

Dispersions 2a of the binder (B1) to prepare particulate compositions according to the invention by emulsification and subsequent radical emulsion polymerization.

| Component | Chemical designation | Amount in wt % |
|---|---|---|
| Epoxy resin | Epichlorohydrin/bisphenol A 2a: EEW: 500-575 g/eq $M_n$: 1200 g/mol | 2a: 17.9 |
| Curing agent | 2a: Santolink | 2a: 1.3 |
| Polymerizate | | 2a: 24.3 |
| | | 2b: 38.3 |
| Monomers | Butyl acrylate | 2a: 6.0 |
| | | 2b: 10.6 |
| | Methacrylic acid | 2a: 3.0 |
| | | 2b: 5.3 |
| | Methyl methacrylate | 2a: 3.0 |
| | | 2b: 5.3 |
| | Hydroxyethyl methacrylate | 2a: 0.7 |
| | | 2b: 1.2 |
| | Styrene | 2a: 7.0 |
| | | 2b: 12.3 |
| | N,N-Dimethylacrylamide | 2a: 1.0 |
| Reactive emulsifier | Hitenol BC 1025 Ammonium polyoxyethylene-(4-nonyl--2-propenylphenyl)ether sulfate | 2a: 3.6 |
| Excipients: | | 2a: 2.0 |
| | | 2b: 9.6 |
| Foam suppressant | 2,4,7,9-Tetramethyl-5-decyne-4,7-diol | 2a: 1.5 |
| | | 2b: 2.6 |
| Plasticizer | Glycol mixture | 2a: 4.0 |
| | | 2b: 7.0 |
| Water | Deionized water | 2a: 56.3 |
| | | 2b: 52.1 |

An initiator system is then added to these water-in-oil emulsions (Table 2) and radical emulsion polymerization of the unsaturated monomer is performed at 60° C. After polymerization, a dispersion of the binder (B1) having a particle portion of approximately 40 wt % is obtained for preparing the pigment-binder particles according to component d) of the composition according to the invention. The dispersion (2a) of the binder (B1) contains thermally crosslinking binder portions in the form of an epoxy resin and a phenol resin while the dispersion (2b) of a binder (B1) is composed exclusively of a polymerizate of monomers having a polymerizable double bond, wherein at least one monomer has at least one acid group. The dispersions prepared in this way have a solids content of 35-40% and a pH between 4.0 and 5.0. The particle size after polymerization corresponds approximately to that of the emulsion before polymerization.

3a, b—Preparation of a Dispersion Containing Pigment-Binder Particles

An aqueous dispersion containing pigment-binder particles is prepared by mechanical homogenization of a pigment portion in powder form with one part of the dispersion (2a, 2b) of the binder (B1).

Next commercial pigments and optionally additional additives such as foam suppressants, organic solvents, flow agents and wetting agents are incorporated into the dispersion (2a, 2b).

A volume-based ratio of pigment to binder (B1) of 0.29 is obtained from Table 4 for the suspension 3a under the assumption of a density of the binder (B1) of 1.2 g/cm³.
Carbon black, Printex® 200: ρ=approximately 1.8 g/cm³
TiO₂, Tiona® 595: ρ=4.1 g/cm³
Sillitin® Z 86: ρ=2.6 g/cm³

TABLE 4

Suspensions 3a and 3b for production of an aqueous dispersion containing pigment-binder particles composed of a pigment portion and a binder portion (B1) by combining using a dissolver and wet milling

| Component | Chemical designation | | Quantity portion in wt % |
|---|---|---|---|
| Dispersion (B1) | Binder portion | 2a: 43.5% 2b: 38.3% | 3a: 65.2 3b: 74.0 |
| Pigment portion | | | 26.4 |
| Colored pigments | Carbon black, Printex ® 200 | | 0.7 |
| | Titanium dioxide, Tiona ® 595 | | 23.5 |
| Fillers | Silicic acid/kaolinite, Sillitin ® Z 86 | | 2.2 |
| Excipients: | | | 3.0 |
| Foam suppressants | 2,4,7,9-Tetramethyl-5-decyne-4,7-diol | | 1.3 |
| Plasticizer | Propylene glycol | | 1.7 |

The suspensions of Table 4 are predispersed for 5-10 minutes using a dissolver (Dispermat® F1, VMA Getzmann GmbH) at a circumferential velocity of the dissolver disk of 21 m/s and then milled for 60 minutes through a mill after replacing the dissolver disk and adding silicon carbide milling beads with a diameter of 1.5 mm, whereupon the weight ratio of beads to milled material is 3:2, so a grindometer value of <10 µm is achieved.

4a, b—Preparation of a Composition According to the Invention

For preparation of the aqueous particulate compositions according to the invention, which are suitable for self-precipitation of organic-inorganic hybrid layers on metallic surface, a portion of the aqueous dispersions 3a and 3b containing pigment-binder particles is mixed with another portion of dispersion 1a and the corresponding amounts of iron(II) ions and fluoride ions by adding appropriate water-soluble compounds.

Compositions according to the invention 4a and 4b with a high stability with respect to agglomeration and dissolution of the oxidic inorganic pigments are summarized in Table 5.

TABLE 5

Self-precipitating particulate compositions 4a and 4b according to the invention

| Component | Chemical designation | | Quantity portion in wt % |
|---|---|---|---|
| a) Dispersion (B) | Binder portion 1a: 38.3% | | 10.6 |
| b) Iron(III) ions | Iron(III) fluoride | | 0.14 |
| c) Fluoride ions | Hydrogen fluoride 59% | | 0.15 |
| d) Dispersion containing pigment-binder particles | Pigment portion | 3a: 26.4% 3b: 26.4% | 4.2 |
| | Binder portion | 3a: 28.4% 3b: 28.4% | |
| Accelerator | Hydrogen peroxide 35% | | 0.15 |
| Water | Deionized water | | 84.8 |

The total particle portion of the compositions according to the invention thus amounts to approximately 6.4 wt %.

What is claimed is:

1. An aqueous particulate composition for self-deposition on metal surfaces, having a pH of less than 4, comprising components:
a. 0.5-10% by weight of at least one dispersed organic binder (B),
b. 0.02-0.3% by weight of iron (III) ions,
c. fluoride ions in an amount such that a molar ratio of fluoride ions to iron (III) ions from water-soluble compounds amounts to at least 2:1, and
d. dispersed pigment-binder particles, comprising a pigment portion and a binder portion (B1), said binder portion (B1) comprising a polymerizate of monomers having polymerizable double bonds, at least one of said monomers having at least one acid group, such that the binder portion (B1) has an acid number of at least 20 mg KOH/g;
   wherein the at least one of said monomers having at least one acid group comprises monomers with sulfonic acid groups, present in an amount of at least 0.5 wt. %, calculated as amount by weight of $SO_3$ in a total binder composed of at least one dispersed organic binder (B) and said binder portion (B1);
   wherein the pigment-binder particles are obtained by dispersion of a pigment portion in powder form, and water, counter ions to b) and c) and optionally other auxiliary substances in amounts such that sum of all ingredients is 100 wt. %, and the dispersed particle content is no less than 3 wt %,
   said composition further comprising as part of the at least one dispersed organic binder (B), said binder portion (B1) or both:
   at least one epoxy resin; and
   curing agents selected from the group consisting of phenolic resins; wherein a weight-based ratio of epoxy resin to phenol resin curing agents is no greater than 95:5 and no less than 50:50,
   wherein the polymerizate further comprises as an ingredient of the binder portion (B1) of the pigment-binder particles of component d) reactive anionic emulsifiers having at least one polymerizable double bond.

2. The composition according to claim 1, wherein the at least one of said monomers having at least one acid group at the polymerizate of the binder (B1) of the pigment-binder particles of component d), comprises a monomer having at least one acid group selected from acrylic acid, methacrylic acid, maleic acid, methylmaleic acid, fumaric acid, itaconic acid, and vinylphosphonic acid.

3. The composition according to claim 1, wherein, the polymerizate of the binder (B1) of the pigment-binder particles of component d), comprises at least two monomers, wherein said at least one of said monomers having at least one carboxyl group and at least one of said monomers having at least one sulfonic acid group.

4. The composition according to claim 1, wherein the polymerizate further comprises, as an ingredient of binder portion (B1) of the pigment-binder particles of component d), at least one monomer with a polymerizable double bond which does not have any acid group and is selected from vinyl esters, vinyl ethers, acrylic acid esters, styrenes and acrylamides.

5. The composition according to claim 1, wherein the pigment of the pigment-binder particles of component d) comprises at least one oxide, carbonate, sulfate or phosphate of one or more metallic or semi-metallic elements; carbon black and/or a metal.

6. The composition according to claim 5, wherein said at least one oxide, carbonate, sulfate or phosphate of one or more metallic or semi-metallic elements is present as one or more water-insoluble salts of silicon, titanium, zirconium, zinc, chromium, manganese, iron, magnesium, calcium and/or barium.

7. The composition according to claim 1, wherein the polymerizate further comprises as an ingredient of the binder portion (B1) of the pigment-binder particles of component d) reactive anionic emulsifiers having at least one polymerizable double bond.

8. The composition according to claim 7, wherein the reactive anionic emulsifiers correspond to the following general structural formula (I):

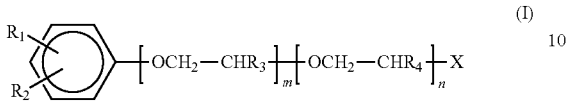

wherein:
$R_1$ is an aliphatic radical with no more than 14 carbon atoms, but at least 3 carbon atoms;
$R_2$ is an unsaturated alkyl radical with no more than 6 carbon atoms but at least 2 carbon atoms;
$R_3$ and $R_4$ independently of one another are selected from hydrogen or a methyl group;
m and n are natural numbers independently of one another, wherein $1 \leq m+n \leq 60$;
X is an anionic group selected from $-O-SO_3$, $-SO_3$, $-O-PO_3$ or $-PO_3$.

9. The composition according to claim 1, wherein as an additional ingredient of the binder portion (B1) of the pigment-binder particles of component d), the at least one epoxy resin, and the curing agents selected from the group consisting of phenolic resins, are present.

10. The composition according to claim 1, wherein as the at least one dispersed organic binder (B) of component a), the at least one epoxy resin, and the curing agents selected from the group consisting of phenolic resins, are present.

11. The composition according to claim 1, wherein the at least one dispersed organic binder (B) of component a) has an acid number of less than 5 mg KOH/g.

12. An aqueous particulate composition for self-deposition on metal surfaces, having a pH of less than 4, comprising components:
a. 0.5-10% by weight of at least one dispersed organic binder (B),
b. 0.02-0.3% by weight of iron (III) ions,
c. fluoride ions in an amount such that a molar ratio of fluoride ions to iron (III) ions from water-soluble compounds amounts to at least 2:1, and
d. dispersed pigment-binder particles, comprising a pigment portion and a binder portion (B1), said binder portion (B1) comprising a polymerizate of monomers having polymerizable double bonds, at least one of said monomers having at least one acid group, such that the binder portion (B1) has an acid number of at least 20 mg KOH/g;
wherein the at least one of said monomers having at least one acid group comprises monomers with sulfonic acid groups, present in an amount of at least 0.5 wt. %, calculated as amount by weight of $SO_3$ in a total binder composed of at least one dispersed organic binder (B) and said binder portion (B1);
wherein the pigment-binder particles are obtained by dispersion of a pigment portion in powder form, and water, counter ions to b) and c) and optionally other auxiliary substances in amounts such that sum of all ingredients is 100 wt. %, and the dispersed particle content is no less than 3 wt %,
wherein the polymerizate further comprises as an ingredient of the binder portion (B1) of the pigment-binder particles of component d) reactive anionic emulsifiers having at least one polymerizable double bond and correspond to the following general structural formula (I):

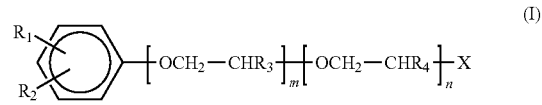

wherein
$R_1$ is an aliphatic radical with no more than 14 carbon atoms, but at least 4 carbon atoms;
$R_2$ is an unsaturated alkyl radical with no more than 6 carbon atoms but at least 2 carbon atoms;
$R_3$ and $R_4$ independently one another are selected from hydrogen or a methyl group;
m and n are natural numbers independently of one another; wherein $1<m+n<60$;
X is an anionic group selected from $-O-SO_3$, $-SO_3$, $-O-PO_3$ or $-PO_3$;
said composition further comprising as part of the at least one dispersed organic binder (B), said binder portion (B1) or both:
at least one epoxy resin, and
curing agents selected from the group consisting of phenolic resins, wherein a weight-based ratio of epoxy resin to phenol resin curing agents is no greater than 95:5 and no less than 50:50.

13. A method for self-depositing coating of a metal surface with an organic binder system comprising inorganic pigments, wherein a metal surface is brought into contact with the composition according to claim 1.

14. A metallic substrate coated by the method according to claim 13.

15. The composition according to claim 1, wherein the at least one dispersed organic binder (B) differs from the binder portion (B1) only in that the at least one dispersed organic binder (B) contains thermally crosslinking phenolic resins as curing agents, said phenolic resins comprising incompletely crosslinked oligomeric or polymeric polycondensation products of formaldehydes with phenols, having at least partially etherified hydroxyl groups.

16. The composition according to claim 12, wherein the binder portion (B1) comprises at least partially a polymerizate of at least two monomers with a polymerizable double bond, such that at least one monomer having at least one carboxyl group is present and at least one monomer having at least one sulfonic acid group is present, wherein the ratio of the total amount of pigments, based on volume, to the total amount of the binder portion (B1), based on volume, does not exceed the value 3, and solids content in the composition amounts to at least 20 wt %.

* * * * *